(12) United States Patent
Shi et al.

(10) Patent No.: US 10,283,011 B2
(45) Date of Patent: May 7, 2019

(54) SYSTEM AND METHOD FOR DEVELOPING SENSE OF RHYTHM

(71) Applicants: Zheng Shi, Beijing (CN); Xin Wang, Beijing (CN)

(72) Inventors: Zheng Shi, Beijing (CN); Xin Wang, Beijing (CN)

( * ) Notice: Subject to any disclaimer, the term of this patent is extended or adjusted under 35 U.S.C. 154(b) by 0 days.

(21) Appl. No.: 16/027,394

(22) Filed: Jul. 5, 2018

(65) Prior Publication Data

US 2018/0315334 A1 Nov. 1, 2018

Related U.S. Application Data

(63) Continuation-in-part of application No. PCT/CN2016/113755, filed on Dec. 30, 2016.

(30) Foreign Application Priority Data

Jan. 6, 2016 (CN) .......................... 2016 1 0006996

(51) Int. Cl.
*G09B 15/02* (2006.01)
*G09B 15/04* (2006.01)
*G09B 15/00* (2006.01)
*G10H 1/00* (2006.01)

(52) U.S. Cl.
CPC ......... *G09B 15/023* (2013.01); *G09B 15/002* (2013.01); *G10H 1/0008* (2013.01); *G10H 2210/066* (2013.01); *G10H 2210/076* (2013.01); *G10H 2210/081* (2013.01); *G10H 2220/096* (2013.01)

(58) Field of Classification Search
CPC ......... G09B 15/00; G09B 15/02; G09B 15/04

USPC ............ 84/470 R, 471 R, 477 R, 483.1, 481, 84/483.2, 609

See application file for complete search history.

(56) References Cited

U.S. PATENT DOCUMENTS

| 5,400,687 | A | * | 3/1995 | Ishii | ...................... | G09B 15/002 |
| | | | | | | 84/477 R |
| 5,878,292 | A | * | 3/1999 | Bell | ...................... | G03B 31/06 |
| | | | | | | 273/237 |
| 6,056,552 | A | * | 5/2000 | Al-Housseini | ......... | G09B 5/065 |
| | | | | | | 434/156 |

(Continued)

*Primary Examiner* — David S Warren

(57) ABSTRACT

The present invention provides a system for developing sense of rhythm. The system includes an interactive surface embedded with an RF antenna, a host, a memory unit, and a media player, an array of contact points on the interactive surface, a display device configured to export the comparison of the tempo and the beat input by a player with the preset tempo and the preset beat, and multiple physical sheets. The function of each contact point is determined or changed by the host in accordance with preset programs. Each physical sheet is embedded with an RFID tag and marked with a musical instrument and corresponding functional components, and the location of the functional components corresponds to the contact points in accordance with the preset programs. Once a physical sheet is placed on the interactive surface, the host is configured to assign a timbre of a musical instrument and the corresponding playing rules to the array of contact points in accordance with the preset programs and the RFID tag embedded in the physical sheet. The visible feedback would help players make corrections more efficiently.

6 Claims, 2 Drawing Sheets

(56) References Cited

U.S. PATENT DOCUMENTS

| | | | | |
|---|---|---|---|---|
| 6,164,534 A * | 12/2000 | Rathus | | G06Q 30/06 |
| | | | | 235/380 |
| 6,655,586 B1 * | 12/2003 | Back | | G06K 7/0008 |
| | | | | 235/375 |
| 7,333,768 B1 * | 2/2008 | Coltman | | G09B 5/062 |
| | | | | 235/454 |
| 7,485,794 B2 * | 2/2009 | Koizumi | | G10H 1/0083 |
| | | | | 84/477 R |
| 7,750,223 B2 * | 7/2010 | Ohshima | | G10H 5/005 |
| | | | | 446/175 |
| 7,874,496 B2 * | 1/2011 | Keam | | G06K 19/06046 |
| | | | | 235/494 |
| 8,188,356 B2 * | 5/2012 | Rose | | G09B 21/003 |
| | | | | 84/447 |
| 8,339,458 B2 * | 12/2012 | Abraham | | G10H 1/0008 |
| | | | | 348/164 |
| 8,605,046 B2 * | 12/2013 | Lu | | G06F 3/0428 |
| | | | | 178/18.01 |
| 8,785,760 B2 * | 7/2014 | Serletic | | G06F 3/0481 |
| | | | | 381/119 |
| 8,902,195 B2 * | 12/2014 | McGibney | | G06F 3/0386 |
| | | | | 250/224 |
| 8,917,972 B2 * | 12/2014 | Abraham | | G10H 1/0008 |
| | | | | 386/200 |
| 9,111,462 B2 * | 8/2015 | Sitrick | | G09B 15/002 |
| 9,183,755 B2 * | 11/2015 | Shi | | G09B 15/023 |
| 9,697,739 B1 * | 7/2017 | Goncalves | | G09B 15/023 |
| 9,728,099 B2 * | 8/2017 | Armstrong | | G09B 15/023 |
| 2007/0039450 A1 * | 2/2007 | Ohshima | | G10H 5/005 |
| | | | | 84/616 |
| 2007/0194101 A1 * | 8/2007 | Rathus | | G06Q 30/02 |
| | | | | 235/375 |
| 2007/0205874 A1 * | 9/2007 | Tokkonen | | B42D 1/007 |
| | | | | 340/10.41 |
| 2008/0060499 A1 * | 3/2008 | Sitrick | | G09B 15/002 |
| | | | | 84/477 R |
| 2008/0072156 A1 * | 3/2008 | Sitrick | | G09B 15/002 |
| | | | | 715/733 |
| 2008/0084271 A1 * | 4/2008 | Jaeger | | H04B 5/02 |
| | | | | 340/5.1 |
| 2008/0097633 A1 * | 4/2008 | Jochelson | | A63B 71/0686 |
| | | | | 700/94 |
| 2009/0079833 A1 * | 3/2009 | Abraham | | G10H 1/0008 |
| | | | | 348/169 |
| 2010/0178028 A1 * | 7/2010 | Wahrhaftig | | A63F 13/00 |
| | | | | 386/352 |
| 2011/0252946 A1 * | 10/2011 | Armstrong | | G09B 15/023 |
| | | | | 84/483.2 |
| 2014/0123834 A1 * | 5/2014 | Wang | | B42D 9/04 |
| | | | | 84/486 |
| 2015/0068387 A1 * | 3/2015 | Shi | | G09B 15/023 |
| | | | | 84/471 R |
| 2015/0095883 A1 * | 4/2015 | Shi | | G06F 3/048 |
| | | | | 717/109 |
| 2015/0242018 A1 * | 8/2015 | Shi | | G06F 3/044 |
| | | | | 345/174 |
| 2016/0180734 A1 * | 6/2016 | Shi | | G06F 3/044 |
| | | | | 434/169 |
| 2017/0186411 A1 * | 6/2017 | Mintz | | A63F 1/00 |
| 2017/0337840 A1 * | 11/2017 | Armstrong | | G09B 15/023 |
| 2018/0315333 A1 * | 11/2018 | Shi | | G09B 15/023 |
| 2018/0315334 A1 * | 11/2018 | Shi | | G09B 15/002 |

* cited by examiner

SYSTEM AND METHOD FOR DEVELOPING SENSE OF RHYTHM

CROSS-REFERENCE TO RELATED APPLICATION

This application is a continuation in part of International Patent Application No. PCT/CN2016/113755, entitled "System and Method for Developing Sense of Rhythm", filed on Dec. 30, 2016, which claims priority of Patent Application CN2016100069966, entitled "Apparatus for Developing Sense of Rhythm", filed on Jan. 6, 2016. The entire disclosure of the above application is incorporated herein by reference.

TECHNICAL FIELD

The present invention relates to electronic musical instruments or electronic toys, in particular, a system and method for developing sense of rhythm of users, based on technologies such as radio frequency identification (RFID).

BACKGROUND

In order to develop sense of rhythm, music teachers usually provide one-on-one instructions to students according to traditional teaching methods, which demands a great deal of manpower. Thus, it is desirable to develop a new way of teaching which doesn't rely on manpower so much.

SUMMARY OF THE INVENTION

Aiming to solve the problems above, the present invention provides an interactive system and the accompanying method for developing sense of rhythm.

In accordance with one embodiment of the present invention, the system includes an interactive surface embedded with an RF antenna, a host, a memory unit, and a media player, an array of contact points on the interactive surface, a display device configured to export the comparison of the tempo and the beat input by a player with the preset tempo and the preset beat, and multiple physical sheets. The function of each contact point is determined or changed by the host in accordance with preset programs. Each physical sheet is embedded with an RFID tag and marked with a musical instrument and corresponding functional components, and the location of the functional components corresponds to the contact points in accordance with the preset programs. Once a physical sheet is placed on the interactive surface, the host is configured to assign a timbre of a musical instrument and the corresponding playing rules to the array of contact points in accordance with the preset programs and the RFID tag embedded in the physical sheet.

In accordance with one embodiment of the present invention, the contact points are spot lights which turn on or off to form a dynamic pattern on the interactive surface in accordance with the preset rules, and the display device is configured to display the comparison of the tempo and the beat input by the player with the preset tempo and the preset beat by the dynamic pattern.

In accordance with one embodiment of the present invention, the memory unit is configured to store the timbre of the musical instrument corresponding to the RFID tag, melodies with known tempo and beat, a data package of reference tempi, a data package of reference beats, the correlation relationships between the location of the functional components of the musical instrument and the contact points, and the rules for turning on or off the spot lights to form the dynamic pattern on the interactive surface.

With the system above, users can train themselves to develop sense of rhythm without asking much help from tutors.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are only for exemplary embodiments of the present invention, and that a person of ordinary skill in the art may derive additional drawings without deviating from the principles of the present invention.

DETAILED DESCRIPTION OF THE INVENTION

To better illustrate the purpose, technical feature, and advantages of the embodiments of the present invention, various embodiments of the present invention will be further described in conjunction with the accompanying drawings.

While the present invention will be described in connection with various specific embodiments, the invention is not limited to these embodiments. People skilled in the art will recognize that the system and method of the present invention may be used in many other applications. The present invention is intended to cover all alternatives, modifications and equivalents within the spirit and scope of invention, which is defined by the apprehended claims.

The technical scheme in the embodiments of the present invention will be described clearly and completely by reference to the accompanying drawings.

Figure 1:
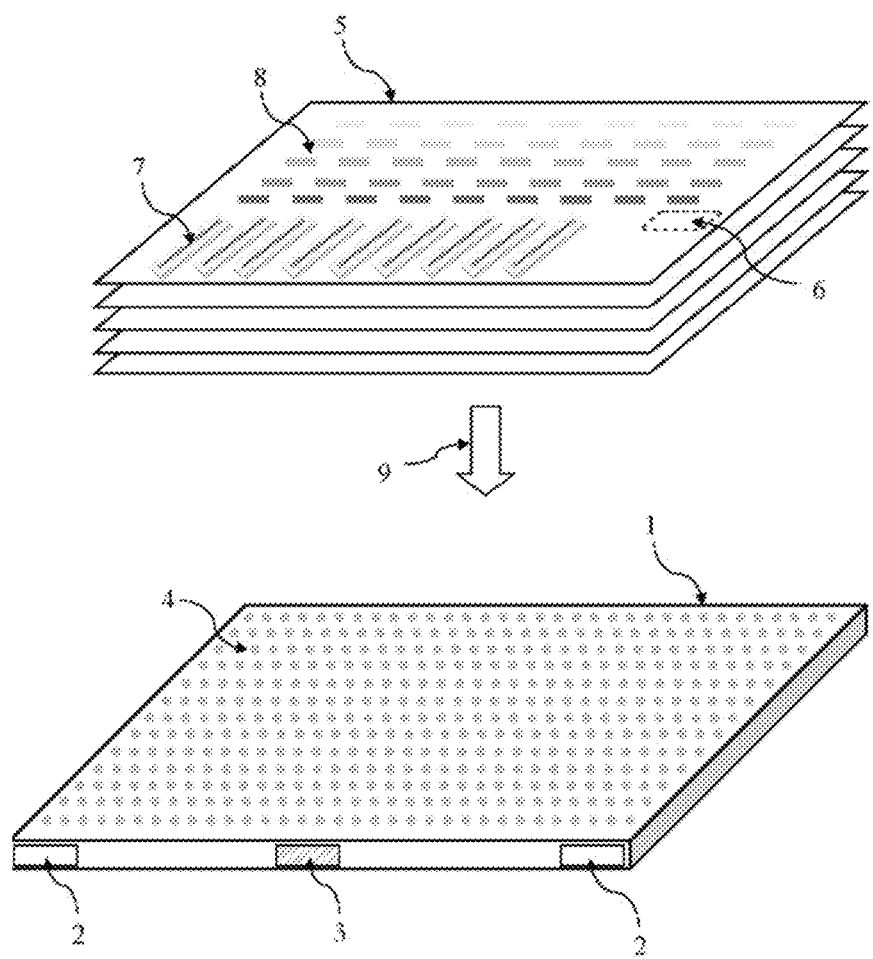
FIG. 1 is a schematic diagram illustrating the structure of the system for developing sense of rhythm in accordance with one embodiment of the present invention.

The present invention introduces a system for developing sense of rhythm, as shown in FIG. 1. The system includes an interactive surface 1, which is embedded with an RF antenna, a host 3, a memory unit, and a media player 2. There is an array of contact points 4 on the interactive surface. The function of each contact point 4 is determined or changed by the host 3 in accordance with preset programs.

The system further includes a display device which is actually a part of the array of contact points that can be turned on and off. The display device exports the comparison of the tempo and the beat input by a player with the preset tempo and the preset beat.

The system further includes multiple physical sheets 5, each embedded with an RFID tag 6. Each physical sheet 5 is marked with a pattern 7 for a specific musical instrument and the corresponding functional components, and the location of the functional components corresponds to the contact points 4 in accordance with the preset programs.

As indicated by the arrow 9 in FIG. 1, once a physical sheet 5 is placed on the interactive surface 1, the host 3 assigns a timbre of a musical instrument and the corresponding playing rules to the array of contact points 4 in accordance with the preset programs, also depending on the RFID tag 6 embedded in the physical sheet 5.

The contact points 4 are spot lights which turn on or off to form a dynamic pattern 8 on the interactive surface 1 in accordance with the preset rules. The display device is a part of the interactive surface 1, and the comparison of the tempo and the beat input by the player with the preset tempo and the preset beat is displayed by the dynamic pattern 8 in real time.

The memory unit stores melodies with known tempo and beat, a data package of reference tempi, and a data package of reference beats. It also stores the pattern for the musical instrument corresponding to the RFID tag 6, the correlation relationships between the location of the functional components of the musical instrument as well as the timbre of the musical instrument and the contact points 4, and the rules for turning on or off the spot lights to form the dynamic pattern 8 on the interactive surface 1.

Figure 2:
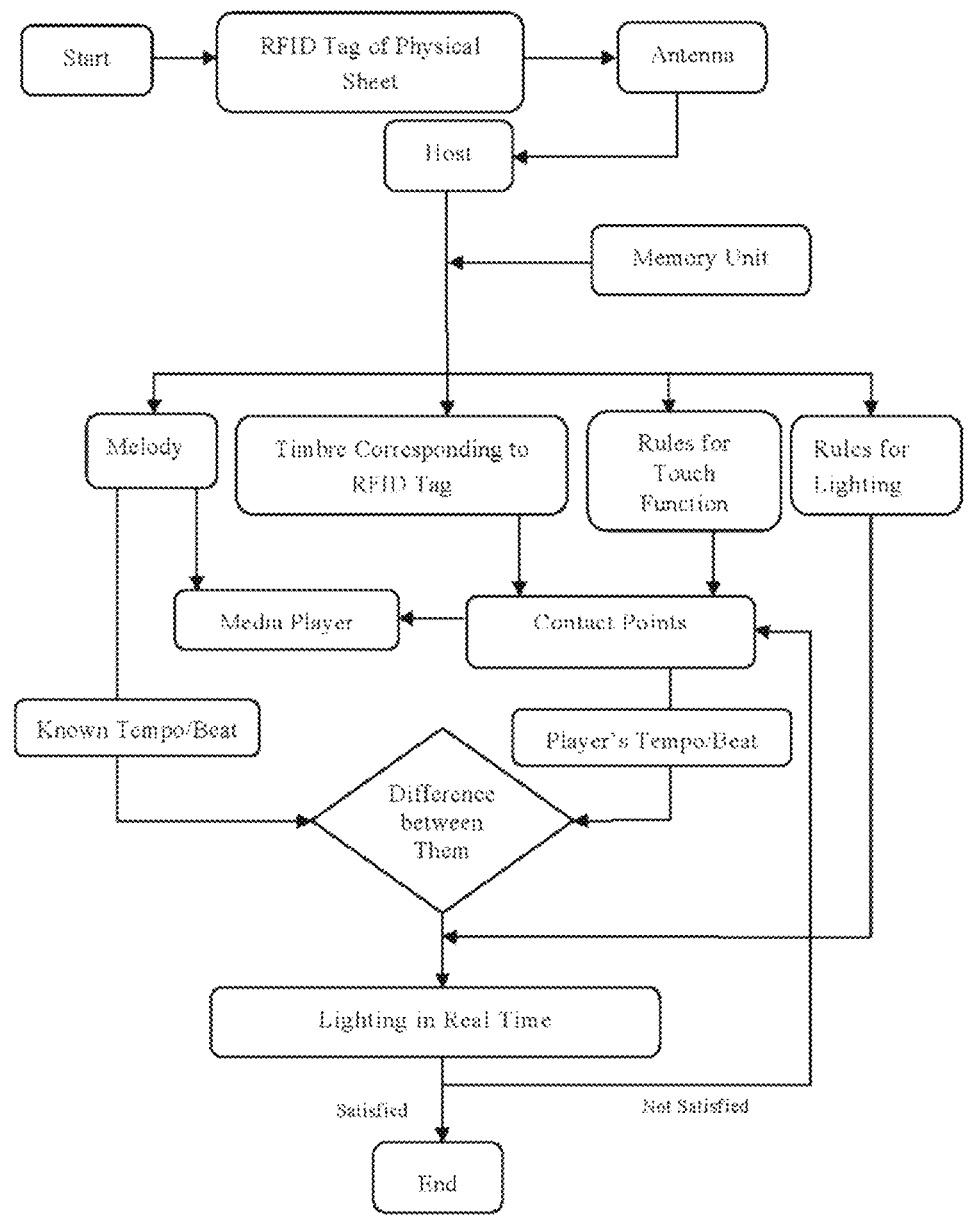
FIG. 2 is a schematic diagram illustrating the process flow of the system for developing sense of rhythm in accordance with one embodiment of the present invention.

FIG. 2 is a schematic diagram illustrating the process flow of the system for developing sense of rhythm in accordance with one embodiment of the present invention. The detail is as follows:

Step 1: as indicated by the arrow 9 in FIG. 1, after starting up the system for developing sense of rhythm, placing a physical sheet 5 on the interactive surface 1.

Step 2: reading the RFID tag 6 and transmitting the ID information of the physical sheet 5 to the host, by the RF antenna.

Step 3: extracting the preset rules regarding functions such as the touch function and turning on or off the spot lights from the memory unit, assigning these functions to the relevant contact points 4 on the interactive surface 1, and determining the timbre of the musical instrument in correspondence to the RFID tag 6, by the host.

Step 4: selecting a melody with known tempo and beat from the memory unit, combining the melody with the timbre determined in step 2, and playing the melody by the media player 2 as background music.

Step 5: touching the contact points 4 covered by the physical sheet 5 marked with the pattern 7 for the musical instrument with his/her own tempo by a player, as accompanied by the melody, and playing the melody through the media player 2.

Step 6: comparing the tempo and the beat input by the player with the known tempo and beat, by the host.

Step 7: exporting the result of the comparison made in step 5, by the display device, and/or providing visible feedback, such as a dynamic pattern of scores, cheers, and boos, by the array of contact points 4, or providing audio feedback by the media player 2, all of which can be designed through the preset programs; in this embodiment, the dynamic pattern 8 generated on the physical sheet 5 combines with the corresponding contact points 4 to flash according to the rules for turning on or off the spot lights, which enables the player to witness the difference between the tempo and the beat input by himself and the preset ones in real time.

Step 8: adjusting the tempo and the beat by the player, to make them consistent with the reference tempo and beat.

The invention claimed is:

1. A system for developing sense of rhythm, comprising:
   an interactive surface embedded with an RF antenna, a host, a memory unit, and a media player;
   an array of contact points on the interactive surface, wherein function of each of the contact points is determined or changed by the host in accordance with preset programs;
   a display device on the interactive surface, configured to export comparison of tempo and beat input by a player with preset tempo and preset beat;
   a plurality of physical sheets, wherein each of the physical sheets is embedded with an RFID tag, and wherein each of the physical sheets is marked with a musical instrument and corresponding functional components, and wherein the location of the functional components corresponds to the contact points in accordance with the preset programs;
   wherein, upon a physical sheet being placed on the interactive surface, the host is configured to assign a timbre of a musical instrument and corresponding playing rules to the array of contact points in accordance with the preset programs and the RFID tag embedded in the physical sheet.

2. The system of claim 1, wherein
   the contact points are spot lights, and the spot lights turn on or off to form a dynamic pattern on the interactive surface in accordance with preset rules; and
   the display device is configured to display the comparison of the tempo and the beat input by the player with the preset tempo and the preset beat by the dynamic pattern.

3. The system of claim 2, wherein the memory unit is configured to store the timbre of the musical instrument corresponding to the RFID tag, melodies with known tempo and beat, a data package of reference tempi, a data package of reference beats, correlation relationships between the location of the functional components of the musical instrument and the contact points, and rules for turning on or off the spot lights to form the dynamic pattern on the interactive surface.

4. A method for developing sense of rhythm, comprising:
   placing a physical sheet on an interactive surface, wherein the interactive surface is embedded with an RF antenna, a host, an memory unit, and a media player, and wherein an array of contact points is placed on the interactive surface and function of each of the contact points is determined or changed by the host in accordance with preset programs, and wherein the physical sheet is embedded with an RFID tag and marked with a musical instrument and corresponding functional components, and wherein the location of the functional component corresponds to the contact points in accordance with the preset programs;
   reading the RFID tag, by the RF antenna, and transmitting the ID information of the physical sheet to the host;
   assigning a timbre of a musical instrument and corresponding playing rules to the array of contact points in accordance with the preset programs and the RFID tag embedded in the physical sheet.

5. The method of claim 4, wherein
   the contact points are spot lights, and the spot lights turn on or off to form a dynamic pattern on the interactive surface in accordance with preset rules; and
   a display device is configured to display comparison of tempo and beat input by a player with preset tempo and preset beat by the dynamic pattern.

6. The method of claim 5, wherein the memory unit is configured to store the timbre of the musical instrument corresponding to the RFID tag, melodies with known tempo and beat, a data package of reference tempi, a data package of reference beats, correlation relationships between the location of the functional components of the musical instrument and the contact points, and rules for turning on or off the spot lights to form the dynamic pattern on the interactive surface.

\* \* \* \* \*